United States Patent
Fehrer et al.

(10) Patent No.: US 6,963,781 B2
(45) Date of Patent: Nov. 8, 2005

(54) ELECTRONIC APPARATUS FOR A BUS SYSTEM

(75) Inventors: Detlef Fehrer, Gundelfingen (DE); Sebastian Heidepriem, Neuenburg (DE); Edgar Stadler, Emmendingen (DE); Urs Vollmer, Freiburg (DE)

(73) Assignee: Sick AG, Waldkirch/Breisgau (DE)

( * ) Notice: Subject to any disclaimer, the term of this patent is extended or adjusted under 35 U.S.C. 154(b) by 0 days.

(21) Appl. No.: 10/666,853

(22) Filed: Sep. 18, 2003

(65) Prior Publication Data

US 2004/0107009 A1 Jun. 3, 2004

(30) Foreign Application Priority Data

Sep. 20, 2002 (DE) .......................................... 102 43 781

(51) Int. Cl.[7] .............................................. G05B 11/01
(52) U.S. Cl. .......................................... 700/19; 700/20
(58) Field of Search ................. 700/19–20; 340/825.06, 340/825.07; 370/371, 374, 363, 368, 401, 465; 709/220, 214–215

(56) References Cited

U.S. PATENT DOCUMENTS

| | | | |
|---|---|---|---|
| 4,858,112 A | | 8/1989 | Puerzer et al. |
| 5,390,301 A | | 2/1995 | Scherf ........................ 719/321 |
| 5,778,226 A | | 7/1998 | Adams et al. |
| 5,896,383 A | | 4/1999 | Wakeland .................... 370/400 |
| 6,298,377 B1 | * | 10/2001 | Hartikainen et al. ......... 709/223 |
| 6,520,235 B1 | * | 2/2003 | Pasti ........................... 156/501 |
| 2002/0027569 A1 | * | 3/2002 | Manni et al. ................ 345/764 |
| 2003/0028268 A1 | * | 2/2003 | Eryurek et al. ............... 700/73 |
| 2003/0220986 A1 | * | 11/2003 | Thakor ........................ 709/220 |

FOREIGN PATENT DOCUMENTS

| | | |
|---|---|---|
| DE | 42 29 931 | 3/1994 |
| DE | 44 17 434 | 11/1995 |
| DE | 195 43 036 | 12/1996 |
| DE | 196 46 219 | 12/1997 |
| DE | 693 15 785 | 4/1998 |
| DE | 197 00 353 | 7/1998 |
| DE | 199 40 230 | 3/2000 |
| DE | 198 47 701 | 4/2000 |
| DE | 198 49 810 | 5/2000 |
| DE | 199 52 391 | 6/2000 |
| DE | 199 19 473 | 11/2000 |
| DE | 100 57 625 | 5/2001 |
| DE | 694 28 512 | 5/2002 |
| DE | 101 09 196 | 9/2002 |
| EP | 1 091 536 A2 | 4/2001 |
| EP | 1 199 846 | 4/2002 |
| WO | WO 02/48856 A1 | 6/2002 |

OTHER PUBLICATIONS

Search Report and English Translation for German Patent No. 102 43 781.5.

* cited by examiner

Primary Examiner—Anthony Knight
Assistant Examiner—Ronald D Hartman, Jr.
(74) Attorney, Agent, or Firm—Harness, Dickey & Pierce

(57) ABSTRACT

An electronic apparatus forming a sensor, an actuator or a control is described comprising a control engine and an integrated bus interface. The apparatus can be connected via the bus interface to a data bus for the communication of the apparatus with at least one further apparatus forming a sensor, an actuator or a control and connected to the data bus. Furthermore, the apparatus includes a device-specific definition engine in which parameters required for the communication, function and/or configuration of the electronic apparatus are stored, with the device-specific definition engine being present in a device-specific format and the parameters being able to be accessed via the control engine. In accordance with the invention, a universal definition engine is provided which is present in a device-independent, standardized format and in which all the parameters of the electronic apparatus required for the communication, function and configuration and additional parameters characterizing the electronic apparatus are stored. Furthermore, the device-specific definition engine can be generated automatically from the universal definition engine.

17 Claims, 3 Drawing Sheets

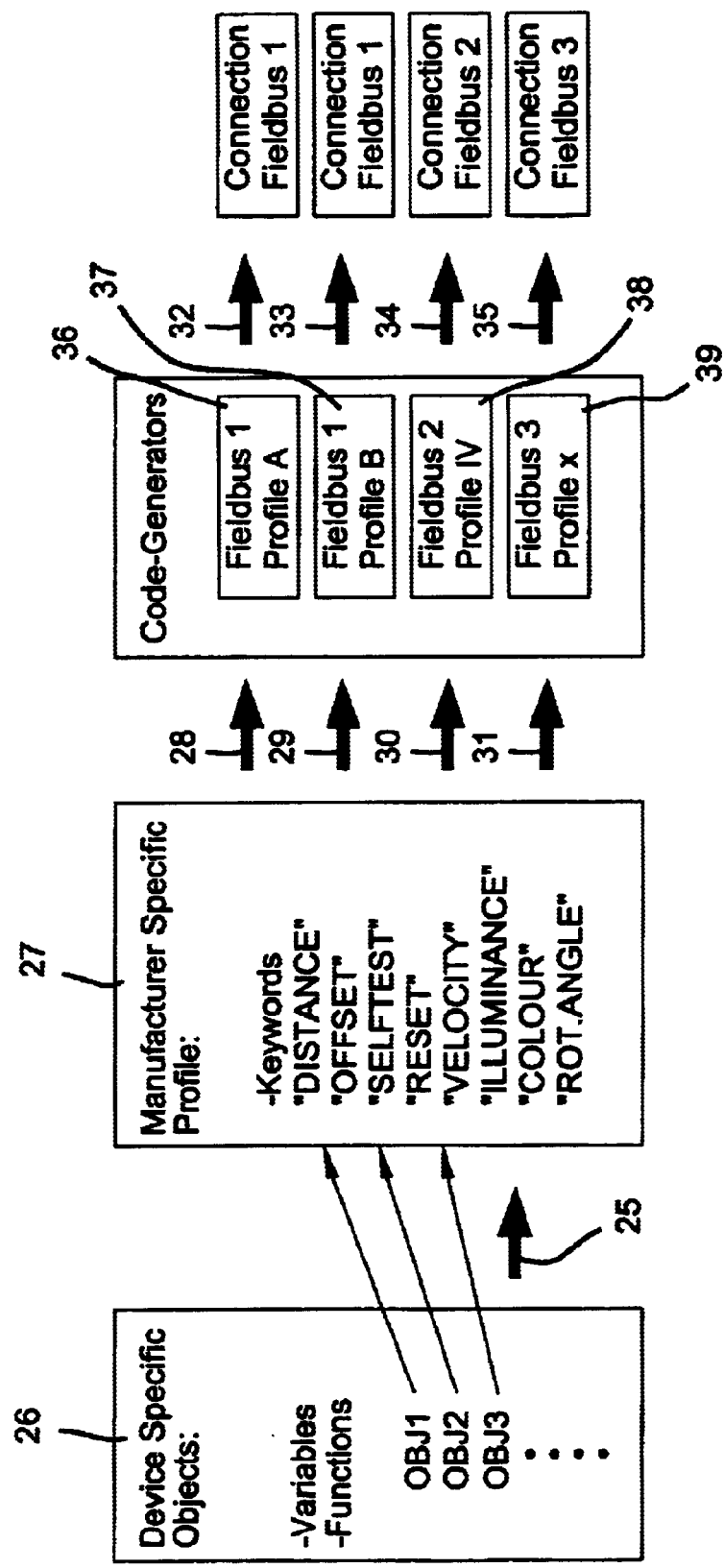

ELECTRONIC APPARATUS FOR A BUS SYSTEM

CROSS-REFERENCE TO RELATED APPLICATIONS

This application claims priority to German Patent Application No. 102 43 781.5 filed Sep. 20, 2002, which application is herein expressly incorporated by reference.

BACKGROUND OF THE INVENTION

The present invention relates to an electronic apparatus forming a sensor, an actuator or a control and comprising a control engine as well as an integrated bus interface via which the apparatus can be connected to a data bus for the communication of the apparatus with at least one further apparatus forming a sensor, an actuator or a control and connected to the data bus and comprising a device-specific definition engine in which parameters required for the communication and/or configuration of the electronic apparatus are stored, with the device-specific definition engine being present in a device-specific format and the parameters being able to be accessed via the control engine.

In many areas of application of automation technology, different devices nowadays communicate with one another via a bus system. A plurality of different bus systems are known based on different communication protocols. Starting with the physical layer, up to the application interface of the individual devices, the fieldbus specifications are each specifically defined in accordance with their area of application.

On the integration of a device into a larger automation solution, a large amount of information has to be exchanged between the individual components via the data bus. Depending on the respective component, the contents of these pieces of information can be very different. These pieces of information can thus, for example, relate to the topological system structure, to parameters of the communication behavior or even to visualization properties for a configuration program (engineering tool). The information required by the surrounding system is as a rule provided via a file which contains a device description. This device description is dependent on the respective device and is also termed a device-specific definition engine within the framework of this application. The device description is present in a device-specific format so that a technical program evaluation of the device description is possible. Since this device-specific format is not universal, but differs from system to system, the required device description must be prepared new in each case for the integration of a device into a specific environment. For this purpose, the developer also requires, in addition to his device-specific technical knowledge, very far-reaching know-how of the respective description language used.

A further problem lies in the fact that the allocation of parameters and functions to specific variables, addresses or channels is usually carried out in so-called profiles (device profiles) with different fieldbuses. These profiles are, however, not only dependent on the respective fieldbus, but also on the respective area of application. If a device should be used in different application fields, an adaptation of the application to the respective profile must be carried out in every single case. This also applies in particular when the standard underlying the profile is changed. Even when no change takes place in the physical bus used, a given object in the device can be mapped on different structures in dependence on the respective application.

If a device should be used in a new field of application or if the definition of the application profile changes, it is therefore necessary to make adaptations to the control engine of the device. These adaptations require detailed knowledge both of the device and of the application profile.

So that a device (sensor, actuator or control) in automation technology can be operated at any desired communication connection (for example a sensor connection to a fieldbus), the device has to be specifically configured for this. Devices which have no display of their own or corresponding input elements require external configuration software (operation software) for the configuration in connection with a description of the device properties. If this description is not present, communication between the configuration software and the device is not possible. If new device variants are introduced it is therefore imperative for the configuration software to be adapted to this new device variant and correspondingly updated.

A further problem area lies in the fact that numerous dependencies between the device parameters have to be taken into account on the parameterization (configuration) of field devices. Specific values or value ranges are under certain circumstances only permitted for individual parameters when other parameters have specific pre-determined values. There is thus a dependency between individual device parameters. The device must therefore check, in particular after a change of device parameters, whether the new parameter set totally satisfies all pre-determined conditions. If at least one of the pre-determined conditions is infringed, it is necessary to change into a suitable error state.

It is sensible that on a parameterization via a configuration tool (on a computer) this configuration tool already checks all pre-determined conditions and also emits a warning on the monitor, where necessary, even with a non-connected device, after the input of corresponding erroneous parameters. Since the corresponding checks are usually programmed in the configuration program independently of the corresponding checks within the devices, it is not precluded that there are differences in the evaluation of the conditions to be checked due to erroneous programming. A parameter set accepted by the configuration software as permitted in the development phase can thus result in a standstill of the device or in another error in operation. Furthermore, the double provision of the corresponding software parts inside the device and inside the configuration software is complex and causes additional costs. The double programming is in particular seen as necessary since the corresponding program parts run on different platforms (different hardware, different programming languages), namely on the one hand inside the device and on the other hand inside the configuration software on a computer, for example on a PC or on a handheld (PDA).

SUMMARY OF THE INVENTION

It is an object of the present invention to provide a cost-favorable and flexible solution with which different electronic apparatuses of the initially named kind, such as sensors, actuators and controls, can be connected to the most varied bus systems. The effort for the use of the devices in different areas of application should also be reduced and the configuration of the devices simplified. At the same time, defective parameterizations of the devices should be reliably recognizable.

This object is satisfied in accordance with the invention starting from an electronic apparatus of the initially named kind in that a universal definition engine is provided which is present in a standardized format independent of the device and in which all parameters of the electronic apparatus required for the communication, for the function and for the configuration as well as additional parameters characterizing the electronic apparatus are stored, and in that the device-specific definition engine can be automatically generated from the universal definition engine.

In accordance with the invention, a universal device description is thus made available which covers all facets and information of a device. This universal device description is formulated in a uniform, device-independent, standardized format such that a plurality of tools are available for the further processing of the information. Due to the standardized universal device description, the relevant proportion for the respective application can be automatically extracted by a compiler or generator and put into the pre-determined device-specific format for the generation of the device-specific device description.

The respective computer must admittedly be prepared new for each application, but when a compiler is present, the device-specific description can be generated automatically for as many different devices as desired. Every developer exclusively requires knowledge in the language in which the universal device description is stored. Specific knowledge in the respective device-specific languages is not necessary since the generation of the device-specific description takes place automatically. Furthermore, the automatic conversion ensures that no parameters are forgotten or interpreted incorrectly.

Depending on the respective environment, the compiler can in each case only convert the required subset from the universal description which is actually required for the respective application.

In accordance with an advantageous embodiment of the invention, further device-specific elements can be automatically generated from the universal definition engine, in particular control engine elements, manufacturer-specific device profiles, functional elements of a configuration unit provided for the electronic apparatus and/or documentations.

In addition to the device-specific technical device description files, descriptions of a completely different kind, such as code for interface drivers (control engine elements) or documentations, can thus be generated automatically directly from the universal device description. The code generated automatically in this manner for interface drivers can then be embedded, for example, in the respective project on the development of the device and can be translated for the generation of the control engine. The code is advantageously automatically generated in the programming language in which the application of the device is also programmed. This can, for example, be programming languages such as C or C++. Generally, however, any other programming language is also conceivable.

In accordance with a further advantageous embodiment of the invention, the manufacturer-specific device profile is also independent of application-specific circumstances such as the bus protocol, the application field or the like, with an application-specific device profile being able to be generated from the manufacturer-specific device profile. In accordance with the invention, a separation thus takes place of manufacturer-specific profile definitions relating to the device from the application-specific device profiles which are dependent on the respective area of application and which depend, for example, on the fieldbus used. A decoupling of the device and the application field thus takes place, which brings about a plurality of advantages. In this manner, a mapping of the device parameters onto the respective equivalents in the manufacturer-specific profile only has to be made once during the development of the device. This partial mapping takes place once per device and in particular does not require any knowledge of application profiles.

The second partial mapping—of the manufacturer-specific profile onto the application profile—takes place separately, in each case once per application profile. The developer does not require any knowledge of the internal workings of the devices for this step since the same partial mapping is available for all devices, i.e. also for devices only to be developed in the future. On a change of the application profile or on the new inclusion of a further profile, changes only have to be made with respect to the second partial mapping—the devices themselves are not affected by this.

The quantity of the mappings required in total is greatly limited by this decoupling of the manufacturer-specific device protocol and the application-specific device protocol. Without such a decoupling, the use of n devices in m application fields requires n*m mappings of the device parameters onto the respective application profile. With the decoupling in accordance with the invention, the number of combinational possibilities reduces to only n+m individual mappings. Each device must be adapted only once using the decoupling in accordance with the invention as the basis—independently of the desired application—namely to the manufacturer-specific profile. Furthermore, precisely one mapping of the manufacturer-specific profile onto the respective application profile is prepared for each application field which can then be used for all devices. By the inclusion of the manufacturer-specific profile as an additional description plane, there is thus a decoupling of the device and of the application field and thus a reduction in the development costs.

In accordance with a further preferred embodiment of the invention, version information is additionally stored in each case at least for some or for all of the parameters stored in the universal definition engine. This version information can be used in a variety of ways. For example, corresponding information can be contained in the automatically generated documentations or a provided configuration unit can correctly parameterize the devices on the basis of the version information and can display at least pre-determined standard parameters in the event of an unknown parameter.

Functional dependencies between individual parameters are preferably stored in the universal definition engine. These functional dependencies are formulated in the form of predicates (conditions). Each condition can include as many parameters as desired. If a dependency is infringed, the value of the condition is set to "FALSE" (logically false), whereby an invalid parameter set is displayed. This dependency check has no side effects, i.e. all the other parameter values remain unchanged.

The functional dependences can be directly formulated in the programming language (for example C or C++) provided for the electronic apparatus such that very complex dependencies can be defined. Generally, the dependencies can also be defined in other suitable languages. Each dependency is implemented as a function with a logical feedback value and can be taken over into the code for the firmware of the device automatically on the conversion into the device-specific definition engine.

In particular when a configuration unit is provided in the form of a configuration program for the configuration of the electronic apparatus, as will be described further below, in accordance with the invention the functional dependences stored in the universal definition engine can automatically be converted into functional elements for the configuration unit. In this manner, an equivalent formulation of the dependencies present, for example in C, is generated in the language provided for the configuration program (for example Java), and is then embedded into the configuration program. It is ensured in this manner that identical dependency checks are made both in the device and in the configuration program. The actual programming of the conditions thus only takes place once so that differences in the dependency checks in the device and in the configuration program are precluded.

In this manner, the validity of a respective parameter set can be bindingly checked without a connected device during an offline parameterization using the software program. An online parameterization with a connected device is likewise possible without restriction and indeed both via the configuration program and via other communication paths. If the parameterization takes place via the configuration program, the dependency check is thus carried out twice, once in the configuration program and additionally directly in the device, whereas with a parameterization via, for example, a memory programmable control, the electronic apparatus independently checks the validity of the parameter set on the basis of the code embedded in the control engine for the parameter check (control engine element).

In accordance with a further advantageous embodiment of the invention, the universal definition engine is formed by one or more files. These files can be present, for example, in XML format. The XML format is advantageous since it defines a formal standard which allows the further processing of the information contained in the universal definition engine with a plurality of tools. Furthermore, XML has the advantage that the information can be stored distributed physically in a plurality of files and that nevertheless a total view as one single document is maintained. Generally, any other format is also suitable which satisfies the formal requirements. The two main components of the universal definition engine are formed by the description of the communication and of the visualization. The format is, however, open and can thus be expanded by further components as required.

In accordance with a further preferred embodiment of the invention, the device-specific definition engine is provided inside the electronic apparatus. In this manner, a very simple addressing of the parameter information is possible, for example starting from another apparatus connected to the data bus or from the configuration program. However, this solution has the disadvantage that relatively high demands are made on the memory requirements inside the device.

It is also advantageously possible for the device-specific definition engine to be provided separately from the electronic apparatus. References generated automatically in the device-specific definition engine to device-specific elements present outside the electronic apparatus, in particular for the configuration unit provided for the electronic apparatus, can be included. These control elements can, for example, represent library elements of a configuration program which are automatically generated from the universal definition engine.

The device-specific definition engine can advantageously be addressed for different electronic apparatuses from a control unit connected to the data bus, in particular from a configuration unit provided for the electronic apparatus, via a uniform, standardized command transported to the control engine via the data bus. Every apparatus connected to the data bus, including a communication unit, can thus call up the device-specific definition engine, or a part of this engine, via a single pre-determined standard command, whereupon device-specific events can be triggered on the basis of the information called up.

For example, the device-specific definition engine can be addressed and evaluated from the configuration unit, whereupon the configuration unit has a different device-specific functional extent in dependence on the parameters read out from the device-specific definition engine. The configuration unit can thus initially transmit a standardized call-up command, which is uniform to all devices, to the device to be configured in each case via the data bus, whereupon said device delivers back parameters required, for example, for the visualization of the corresponding configuration program. Such parameters can, for example, be the size of device-specific parameter lists, the content of such parameter lists, help texts or tool tips. The configuration program interprets the parameters taken up and generates a corresponding configuration interface. A configuration of the device-specific parameters, which are sent to the device via the data bus, can then take place via this configuration interface.

In this manner, the configuration program, which is usually designed as a computer program which can run on a conventional computer, can be used independently of the respective devices and, thanks to the variable functional extent which can be configured automatically via the device-specific engine, contains an interface specifically tailored to the respective device.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 4 is a division in accordance with the invention into a manufacturer-specific profile and an application-specific profile.

DETAILED DESCRIPTION OF THE PREFERRED EMBODIMENTS

The following description of the preferred embodiment(s) is merely exemplary in nature and is in no way intended to limit the invention, its application, or uses.

Figure 1:
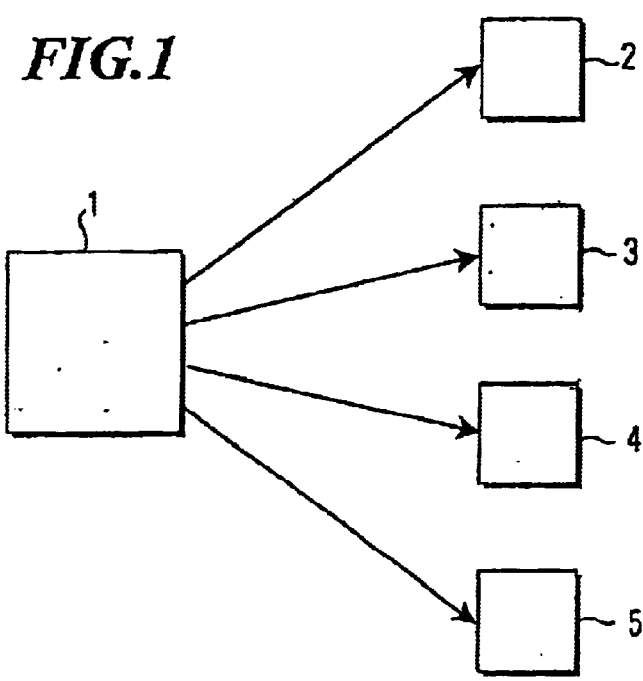
FIG. 1 is a schematic representation of the generation of different elements from a uniform definition engine.

FIG. 1 shows a universal definition engine 1 (universal device description) which is stored, for example, as an XML file and in which all facets and information of an electronic apparatus forming a sensor, an actuator or a control are stored in a fixedly pre-determined format. Important elements are, for example, a communication interface description as well as a visualization interface description for a configuration program of the electronic apparatus.

In accordance with the invention, a plurality of different device-specific elements can be generated from the universal definition engine, for example a documentation 2 (in a text format or in a word processor format). This documentation can be printed out or read on a computer and is automatically always complete and always at the latest device status.

A further conversion of data from the universal definition engine 1 can take place in the generation of program code 3 for the electronic apparatus. This generated program code can be embedded, for example, into the firmware of the device and can include the interface code for the connection of the electronic apparatus to a certain bus protocol, program code for the checking of specific dependencies between individual device parameters or references to device-specific data stored outside the apparatus.

Furthermore, conversions of data stored in the universal definition engine 1 are possible into data 4 relevant for a configuration program, for example visualization parameters, dependency conditions between individual parameters or code for library elements for the configuration program.

Finally, the automatic generation of a device description 5 for different fieldbuses, for example, a GSD file for the Profibus, is also possible from the universal definition engine 1.

Figure 2:
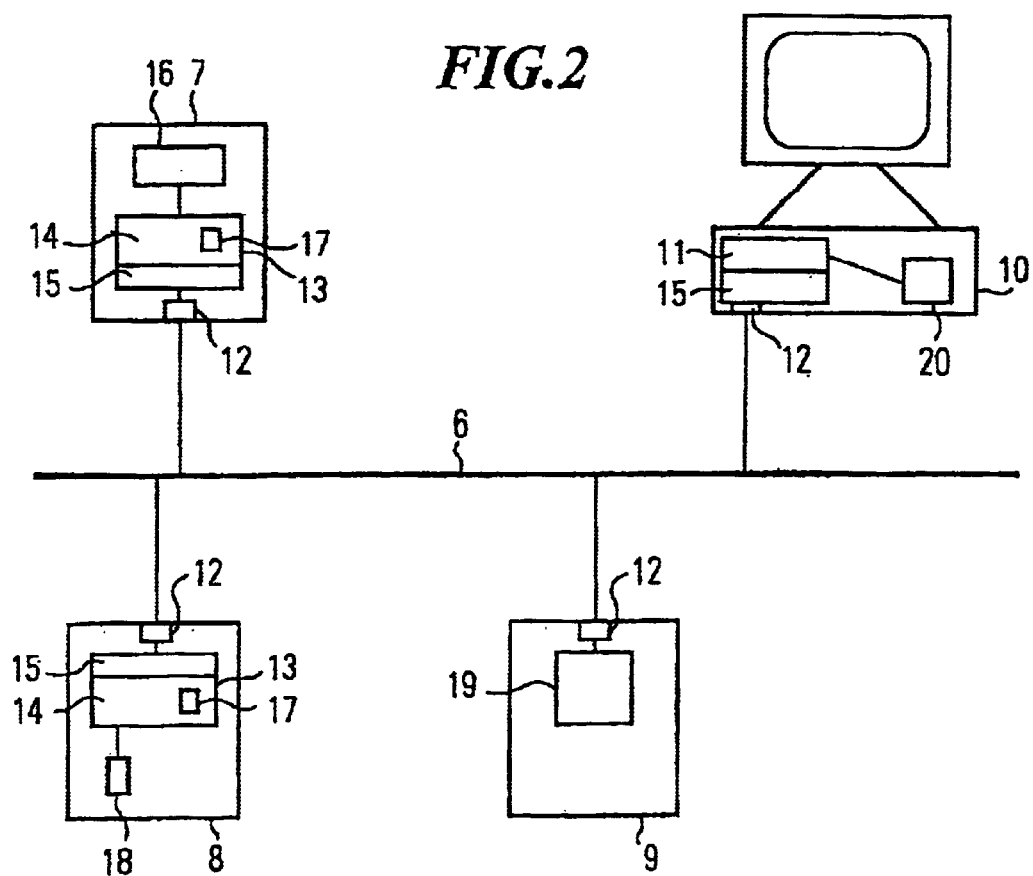
FIG. 2 is a block diagram of a bus system with apparatuses in accordance with the invention.

FIG. 2 shows a data bus 6 to which two electronic apparatuses 7, 8 in accordance with the invention, an external data memory 9 as well as a configuration unit 11 made as a computer program running on a computer 10 are connected.

The apparatus 7 includes an integrated bus interface 12 for the connection to the data bus 6 and a control engine 13 provided inside the apparatus 7 can communicate with apparatuses connected to the data bus 6 via it. The control engine 13 includes an application engine 14 as well as a bus interface engine 15 by which the data generated by the application engine 14 are converted into the bus protocol used or by which data received via the bus are converted into a corresponding format for the application engine 14.

The apparatus 7 furthermore includes a device-specific definition engine 16 which contains important parameters for the device 7 generated from the universal definition engine 1 (FIG. 1). The device-specific definition engine 16 can be addressed via the control engine 13 such that, for example, parameters stored in the device-specific definition engine 16 can be communicated on request to a further apparatus connected to the data bus 6 via the interface 12 and the data bus 6.

In addition to the bus interface engine 15, the control engine 13 includes a further control engine element 17 which is likewise generated from the universal definition engine 1 and is embedded into the control engine 13 and describes functional dependencies between individual parameters of the apparatus 7. An automatic check of pre-determined conditions between device parameters is possible via these functional dependencies stored in the control engine 17 so that defective parameterizations are automatically recognized and avoided.

The apparatus 8 differs from the apparatus 7 only in that not the total specific definition engine 16 is contained directly in the apparatus 8, but only some of the device-specific definition engine 18. This device-specific definition engine 18 contains, for example, references to device-specific elements 19, 20 which are stored, for example, in the external data memory 9 and/or in a memory of the computer 10. The memory requirements of the device 8 can be reduced in this manner.

Figure 3:
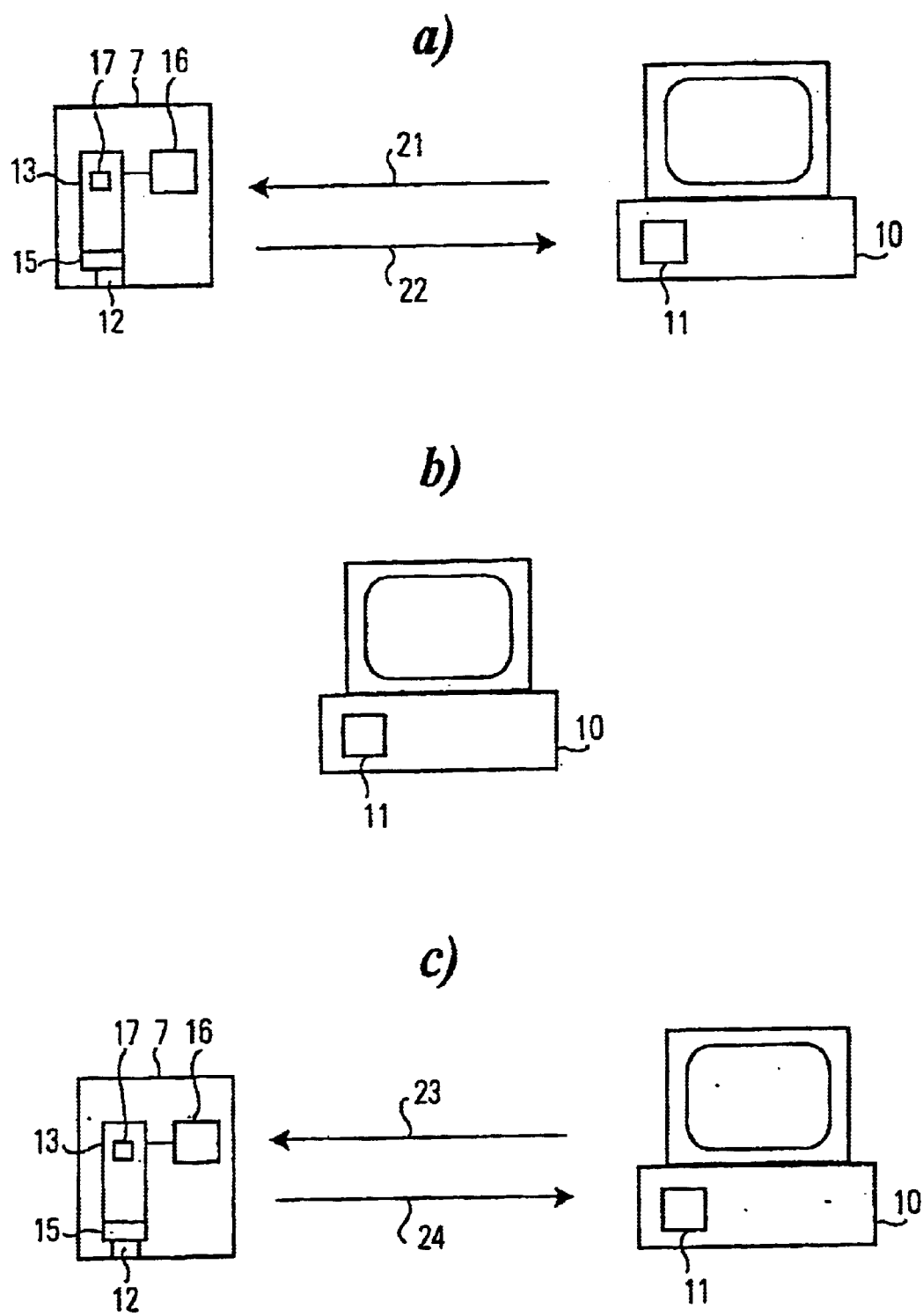
FIG. 3 is a schematic representation of the communication between an apparatus made in accordance with the invention and a configuration unit.

The communication between the apparatus 7 made in accordance with the invention and the configuration unit 11 is shown by an example in FIG. 3. In a first step shown in FIG. 3a), a standardized command is sent by the configuration unit 11 via the data bus 6 to the apparatus 7 with which the delivery of the device-specific parameters, such as have been stored in the device-specific definition engine 16, are requested. This request is indicated by an arrow 21.

In response to this request, the apparatus 7 transmits the specific device description to the configuration unit 11 in a defined standard format, as is represented by an arrow 22.

The transmitted parameters are interpreted by the configuration unit 11 in FIG. 3b), whereupon an interface of the configuration unit (configuration program) 11 tailored specifically to the device is generated. Depending on the received device-specific parameters, masks, field contents, help texts, tool tips and the like are automatically adapted in the configuration program 11 such that a configuration program specifically adapted to the apparatus 7 is generated from the initially general configuration program.

In accordance with FIG. 3c), the desired changes to the device parameters can be made via this specifically adapted interface of the configuration unit 11, with a check of pre-determined functional dependencies between the parameters already being checked inside the configuration unit by means of corresponding rules generated from the universal definition engine 1. The parameters to be changed are transmitted in accordance with an arrow 23 into the device, where a check is likewise made of the functional dependencies stored inside the control element 17.

If no errors occur on this check, the apparatus 7 returns an O.K. message to the configuration unit 11 in accordance with the arrow 24. Otherwise an error message is generated.

FIG. 4 shows the separation in accordance with the invention of manufacturer-dependent device profiles and application-specific profiles.

In accordance with FIG. 4, a mapping of device-specific objects 26 onto a manufacturer-specific profile 27 represented by an arrow 25 takes place in a first, unique step during the development of the device. The corresponding device-specific objects can in turn be taken from the universal definition engine 1.

The development of the mapping 25 only takes place once per device and in particular does not require any knowledge of application profiles.

Only after the pre-determination of an application profile is a second mapping generated which is based on the manufacturer-specific profile 27 and which is in each case dependent on the desired application profile. Corresponding four mappings are shown in FIG. 4 by arrows 28, 29, 30 and 31. For example, the mapping 28 provides the conversion of the manufacturer-specific profile 27 onto a fieldbus 1 with profile A (application profile 36), while the mapping 29 represents the conversion onto the fieldbus 1 with profile B (application profile 37). In a similar manner, the arrows 30, 31 represent the mappings in each case from the manufacturer-specific profile 27 onto different fieldbuses with different application profiles 38, 39. A connection to the pre-determined fieldbus is then possible via the generated application-specific profiles 36, 37, 38, 39 as is represented by arrows 32 to 35.

If one of the application profiles 36, 37, 38, 39 should be changed or a new application profile added, only a corresponding partial mapping of the manufacturer-specific profile 27 onto the changed/new application profile is necessary. The partial mapping 25 of the device-specific objects 26 onto the manufacturer-specific profile 27 is not affected by this.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An electronic apparatus forming one of a sensor, an actuator and a controller and that communicates with an additional electronic apparatus through an integrated bus interface, the electronic apparatus comprising:
   a control engine;
   a device-specific definition engine in which at least one of communication, function and configuration parameters are stored, wherein the device-specific definition engine is in a device-specific format and the parameters are accessible by the control engine; and
   a universal definition engine that is in a device-independent, standardized format, that stores each of the communication, function and configuration parameters and additional parameters characterizing the electronic apparatus and that automatically generates the device-specific definition engine.

2. The electronic apparatus of claim 1, wherein one device-specific element includes at least one of control engine elements, manufacturer-specific device profiles, functional elements of a configuration unit provided for the electronic apparatus and documentations automatically generated from the universal definition engine.

3. The electronic apparatus of claim 2, wherein the manufacturer-specific device profile is independent of a bus protocol and wherein an application-specific device profile is generated from the manufacturer-specific device profile.

4. The electronic apparatus of claim 1, wherein respective version information is stored for at least one of the parameters stored in the universal definition engine.

5. The electronic apparatus of claim 1, wherein functional dependencies between individual parameters are stored in the universal definition engine.

6. The electronic apparatus of claim 5, wherein the functional dependencies are converted into control engine elements and wherein dependencies between parameters are checked by the control engine using the control engine elements.

7. The electronic apparatus of claim 1, wherein the universal definition engine is formed by at least one file.

8. The electronic apparatus of claim 7, characterized in that the file is in XML format.

9. The electronic apparatus of claim 1, wherein the device-specific definition engine is provided inside the electronic apparatus.

10. The electronic apparatus of claim 1, wherein the device-specific definition engine is provided at least partly separate from the electronic apparatus.

11. The electronic apparatus of claim 1, further comprising references automatically generated by the device-specific definition engine to device-specific elements present outside of the electronic apparatus, so as to control elements of a configuration unit provided for the electronic apparatus.

12. The electronic apparatus of claim 1, wherein the device-specific engine is addressed for different electronic apparatuses by a control unit connected to the data bus, in particular by a configuration unit provided for the electronic apparatus, using a uniform, standardized command transported to the control engine through the data bus.

13. The electronic apparatus of claim 1, wherein a configuration unit is connected to the data bus, wherein the device-specific definition engine is addressed and evaluated by the configuration unit, and the configuration unit includes different device-specific functions that depend on parameters read out of the device-specific definition engine.

14. The electronic apparatus of claim 13, wherein the configuration unit is provided as a computer program.

15. The electronic apparatus of claim 13, wherein visualization parameters stored in the universal definition engine are converted into corresponding visualization parameters of the device-specific definition engine and wherein an interface of the configuration unit changes based on the visualization parameters read out of the device-specific definition engine.

16. The electronic apparatus of claim 13, wherein functional dependencies stored within the universal definition engine are converted into functional elements of the configuration unit and wherein dependencies between parameters are checked by the configuration unit using the functional elements.

17. A bus system, comprising:
   a data bus; and
   a plurality of electronic apparatuses connected to the data bus, each electronic apparatus forming one of a sensor, an actuator and a controller and comprising:
      a control engine;
      a device-specific definition engine in which at least one of communication, function and configuration parameters are stored, wherein the device-specific definition engine is in a device-specific format and the parameters are accessible by the control engine; and
      a universal definition engine that is in a device-independent, standardized format, that stores each of the communication, function and configuration parameters and additional parameters characterizing the electronic apparatus and that automatically generates the device-specific definition engine.

* * * * *